United States Patent [19]

McLennan et al.

[11] 4,085,684
[45] Apr. 25, 1978

[54] QUICK DISCONNECT TIE-DOWN ANCHOR

[75] Inventors: Richard Earl McLennan, Rancho Palos Verdes; Robert Looker, Carpenteria, both of Calif.

[73] Assignee: Satron, Inc., El Segundo, Calif.

[21] Appl. No.: 762,384

[22] Filed: Jan. 26, 1977

Related U.S. Application Data

[63] Continuation-in-part of Ser. No. 596,666, Jul. 17, 1975, Pat. No. 4,020,770.

[51] Int. Cl.² ............... A44B 19/00; B25B 25/00; B60P 7/08; B61D 45/00
[52] U.S. Cl. .............................. 105/482; 105/485
[58] Field of Search ................ 24/208 R, 211 R; 105/464, 465, 475, 476, 477, 478, 479, 480, 481, 482, 483, 484, 485; 248/346

[56] References Cited

U.S. PATENT DOCUMENTS

| | | | |
|---|---|---|---|
| 2,688,504 | 9/1954 | Parker | 105/482 |
| 2,743,684 | 5/1956 | Elsner | 105/482 X |
| 3,212,457 | 10/1965 | Looker | 105/482 |
| 3,241,501 | 3/1966 | Watts | 105/482 |
| 3,713,616 | 1/1973 | Bowers | 105/482 |
| 4,020,770 | 5/1977 | McLennan et al. | 105/482 |

*Primary Examiner*—Drayton E. Hoffman
*Assistant Examiner*—Howard Beltran
*Attorney, Agent, or Firm*—George F. Smyth

[57] ABSTRACT

A quick disconnect dual stud type of track tie-down fitting for use with a track having slots and lips includes an insert having a generally U-shaped body and including spaced integral legs arranged in parallel alignment. Cooperating with the insert is a retainer having apertures therein which receive the legs of the insert, the ends of the legs carrying studs which pass through the slots of the track and which can engage the lips of the track. Carried by the retainer and located between the studs is a locking nub which secures the tie-down fitting in the track by being received within a slot thereof while the studs are engaged with lips of the track adjacent to the slot. The retainer is biased into the locking position by springs cooperating with the legs of the insert to urge the retainer into the locking position. By forming the insert as an integral U-shaped member, the cost of the unit is substantially reduced while the overall-structure is vastly simplified.

5 Claims, 7 Drawing Figures

U.S. Patent      April 25, 1978      4,085,684
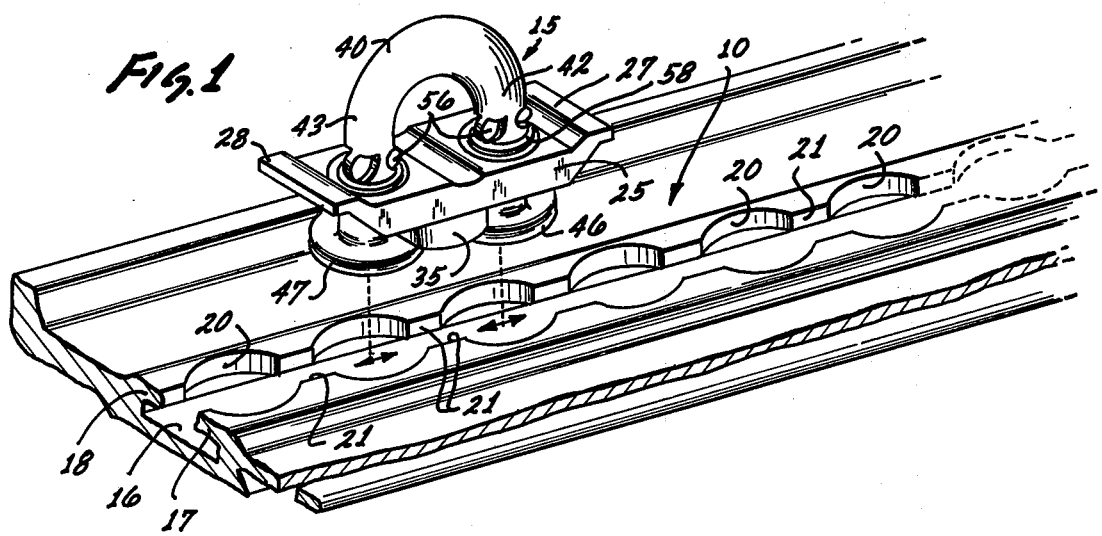
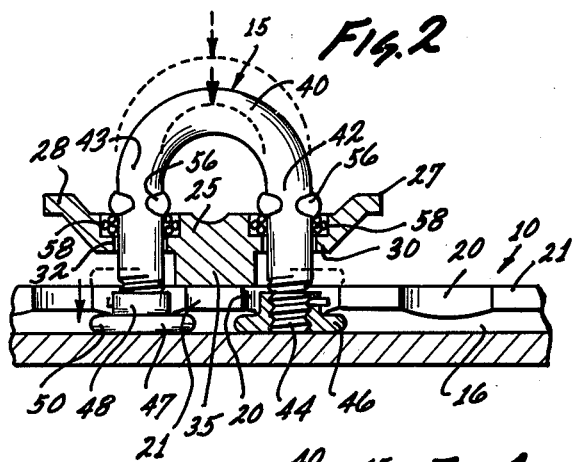
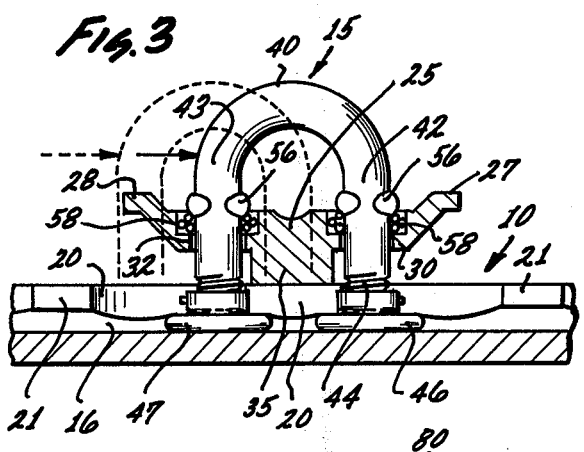
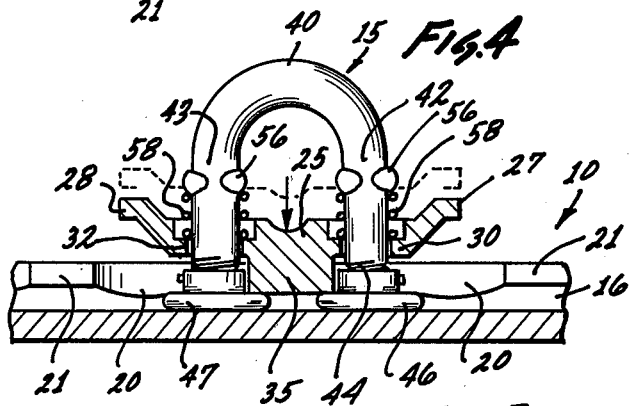
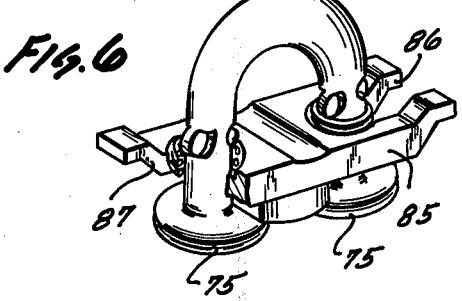
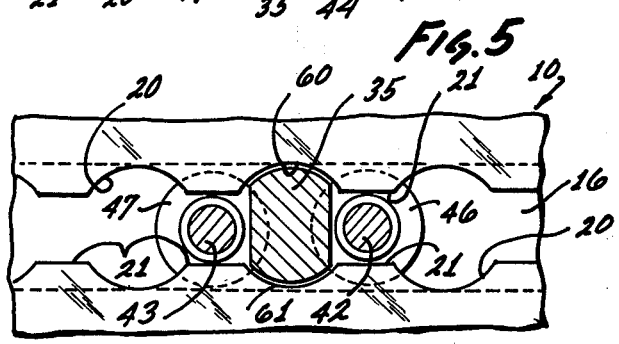
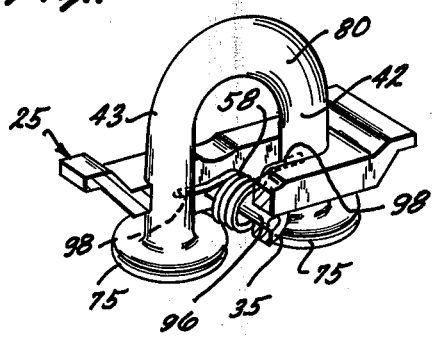

QUICK DISCONNECT TIE-DOWN ANCHOR

BACKGROUND OF THE INVENTION

This application is a continuation-in-part of the application "QUICK DISCONNECT TIE-DOWN ANCHOR" by Richard E. McLennan, et al., Ser. No. 596,666, filed July 17, 1975, issued May 3, 1977 as U.S. Pat. No. 4,020,770, and assigned to the assignee of the present invention. The present application is directed to the embodiment shown in FIG. 7 herein.

This invention relates to a quick disconnect anchor and more particularly to an improved quick disconnect dual stud type track tie-down anchor utilizing an integrally formed U-shaped member having studs at its ends to secure the anchor to a track. Such anchors are sometimes referred to as fittings.

Anchors of the type described herein find advantageous use in connection with aircraft cargo equipment and especially for use in a tie-down system in which it is desired to secure the cargo to a floor or pallet in which the floor or pallet includes a track usually in the form of a metal extrusion.

DESCRIPTION OF THE PRIOR ART

Tie-down track anchors are known and are used to make a quick connection to a track, the anchor normally including a ring which receives a single or multiple strap or rope or hook. These anchors are normally rated in accordance with strength, and a single stud anchor is normally rated in the range of 2,000 pounds in a horizontal plane, 3,000 pounds at an angle of 45° to the mounting plane and 4,000 pounds perpendicular to the mounting frame.

In the case of a single stud track anchor, a retainer is provided having downwardly extending lips through which the stud is mounted, the retainer being biased downwardly with respect to the stud.

Another type of tie-down anchor is that referred to as the two-stud tie-down anchor, rated at a much higher strength than the single stud tie-down anchor. The tie-down anchors of the dual stud type of the prior art may be of two general types. In one type, the studs are affixed to a cross-member by being threaded at each end of the cross-member, while the center portion of the cross-member includes a separate center piece to which a ring is secured, the center piece normally including a shoulder received within a counterbore of the cross-member such that there is 360° movement of the center piece and the attached ring. Cooperating with the studs is a retainer member biased to the locking position. The difficulty with this type of prior art structure is the cost of manufacture and the necessity for manual assembly of the various elements making up the unit. For example, the cross-member must be tapped to receive the studs which include threaded shanks. The cross-member must be counterbored to receive the center piece to which the ring is attached and welding the ring to form a closed loop. Thus, the load path is through the ring, through the center piece, through the cross-member, and through the studs to the track. Effectively, the load path is made up of five separate elements.

Another form of multiple stud tie-down anchor is described in U.S. Pat. No. 2,743,684 of May 1, 1956. Still another form of cargo tie-down anchor is shown in U.S. Pat. No. 2,688,504 of Sept. 7, 1954.

Still another type of tie-down fitting is that in which the load bearing member is a forging having spaced arms through which a strap may pass, the bottom arm including studs which are received within the slots of the track. Laterally of the studs and arranged crosswise is a retainer member used to secure the anchor within the track. While the latter type anchor operates satisfactorily, it is relatively expensive to make because of the cost of the forging which constitutes the principal component of the structure.

Basically, the problems with the prior devices relate to the manufacturing cost and expense thereof either because of the use of a multiplicity of components or the use of an expensive forging. As will be appreciated, a relatively simple structure which provides the strength needed for a tie-down anchor, especially of the two-stud variety offers advantages to the industry.

SUMMARY OF THE INVENTION

The quick disconnect dual-stud type track tie-down anchor of the present invention is intended for use with a track having slots and lips each of predetermined dimensions. These tracks are well known in the prior art and are shown for example in U.S. Pat. No. 2,743,684, previously identified. In the usual form of usage, the track may be affixed to the floor of an aircraft, or form the edge rail of a pallet or other type of cargo handling equipment. The tie-down anchor is intended to be used with this type of track for receiving other elements of a cargo restraint system, either the net for the cargo, or buckles which are attached to the net or other form of cargo restraint devices.

In accordance with the present invention, the principal load bearing member of the two-stud, tie-down anchor is made of an integrally-formed insert having a generally U-shaped body member and including integral spaced parallel legs which are arranged in alignment. Each of the legs includes a stud which is received within the slot of the track, and which, in the locked position of the anchor, engages the lips of the track. Cooperating with the insert is a retainer having apertures therein through which the integrally formed legs of the insert pass, the retainer including a locking nub positioned on the underside thereof and located between the adjacent studs.

Spring means cooperate with the insert and with the retainer to urge the retainer downwardly towards the studs to the locking position.

In use, the tie-down anchor is positioned over the track such that the studs are aligned with the slots in the track, and the integral U-shaped insert is pushed downwardly against spring tension such that the studs are capable of clearing the underside of the adjacent lips. The fitting is then moved sideways along the track until the locking stud on the underside of the retainer is aligned with one of the slots. As alignment is achieved, the spring biases the retainer downwardly such that the locking nub is received within the slot while the studs on each of the arms are positioned beneath lips formed in the track. In this relative position, the anchor is secured to the track and the elements of the restraint system, if not already affixed, may be assembled to the U-shaped loop formed by the U-shaped insert from which the spaced integral legs extend. Thus the load-bearing insert is formed of one principal component which is the generally U-shaped body member having the spaced integrally formed parallel legs.

To remove the tie-down anchor from the track, the retainer is lifted away from the track against the pressure of the biasing members such that the locking nub of the retainer clears the slot in which it is received. The entire anchor is then moved sideways in one or the other direction until the studs on the ends of the legs are aligned with the apertures and the anchor is easily removed from the track.

In the form just described, the studs may be secured to the legs by providing threaded ends of the legs and threaded studs which are screwed thereon and then pinned or otherwise deformed so that the studs are permanently affixed in non-rotating relation to the ends of the legs. In another form, the studs on the ends of the legs may be cold headed so that they are integral with the ends of the legs.

In those embodiments in which the studs are integral with the legs, the retainer may be of two pieces which are assembled over the legs and then pinned together. In a preferred embodiment a one-piece retainer has an elongated aperture through which the rounded end of the U-shaped insert is inserted and retained by a pin extending through the retainer between the legs of the insert. A torsion spring encircles the pin and the ends of the spring are inserted into small holes in the legs to provide the desired biasing action.

Regardless of the details of the structure, one of the important aspects thereof is the fact that the principal load bearing member is of a unitary structure as compared to prior devices. It is the unitary structure of the principal load bearing element which vastly simplifies the manufacture and reduces the resulting cost of the anchor.

By way of example, the insert may be formed from an insert blank in the form of a straight length of bar stock either threaded at each end, or having formed at each end integrally cold headed studs. The bar is then bent into a U-shape with care being taken to assure that the legs are in parallel relation and in alignment, with the ends thereof likewise being in alignment. Thereafter, spring stops may be formed on the legs, as by swaging, and the resulting unit is ready for assembly into a retainer.

In the case of an insert having threaded legs, the formed insert has assembled thereto the spring members, and the legs of the insert are then positioned through the apertures of the retainer, the studs are then threaded on the ends of the legs and deformed or pinned to secure them to the ends of the legs in nonrotating relationship.

It will be apparent from the following detailed description that a much improved and relatively simple dual stud type track tie-down anchor is provided. Further features and advantages thereof may be best understood by reference to the following description taken in connection with the accompanying drawings.

BRIEF DESCRIPTION OF THE DRAWINGS

FIG. 1 is an isometric view of the improved tie-down anchor of the present invention and illustrating the type of track with which it may be used;

FIG. 2 is a view partly in section and partly in elevation showing the initial operation in inserting the tie-down anchor in the track;

FIG. 3 is a view similar to FIG. 2 but illustrating the tie-down anchor in the locked position;

FIG. 4 is a view similar to FIG. 3 showing the anchor in the locked position and movement of the retainer in order to release the anchor;

FIG. 5 is a view from the underside of the anchor showing the relationship between the track and the studs of the anchor;

FIG. 6 is a modified form of dual stud track anchor in accordance with the present invention; and FIG. 7 is a perspective view partly in section of a preferred embodiment of the dual stud track anchor of the present invention.

DETAILED DESCRIPTION OF THE INVENTION

Referring to the drawings which illustrate several embodiments of the invention, FIG. 1 shows a track 10 and a quick disconnect dual stud type track anchor 15 in accordance with this invention. In the particular form illustrated in FIG. 1, the track is illustrated as a component of a pallet used for air cargo, the track constituting an element of the frame which supports a central panel on which the air cargo is loaded. In normal usage, restraining means are affixed to the rail to secure the cargo on the pallet, by using nets in the form of webbing or rope in which the rope, webs, or buckles affixed thereto engage the anchor which is secured to the track.

As shown, the track includes a groove 16 therein with spaced upper flanges 17 and 18. The flanges are provided with a series of slots 20 and adjacent lips 21, each of a predetermined dimension, the slots and lips functioning to permit assembly of a tie-down anchor to the track as will be described hereafter.

The anchor of the present invention, one form of which is shown in FIGS. 1-5, includes a retainer member 25 having spaced lifting ends 27 and 28, the retainer including spaced apertures 30 and 32 whose centers are spaced and in alignment with the centers of adjacent slots 20 of the track 10. Extending downward and integrally formed with the retainer member 25 is a locking member in the form of stud 35 proportioned to be received in one of the slots 20 of the track.

Cooperating with the retainer 25 is an insert member 40 generally U-shaped and including integral legs 42 and 43 which are substantially in spaced parallel relation and in alignment. Each of the legs is of the same length and threaded at the end as shown at 44 to receive the studs 46 and 47. The center line of each of the legs is substantially in alignment with the center line of the cooperating apertures 30 and 32 of the retainer 25 and the center line of adjacent slots 20 of the track 10.

Each of the studs 46 and 47 is configured to be received and pass through adjacent slots 20 of the track 10, the studs each including a shank 48 of reduced cross-section and a toe portion 50 of enlarged diameter, the bottom of the toe being the stud face. The diameter of each shank and each leg of the insert 40 is proportioned to pass sideways through the faces of opposed lips 21 of the track, while the diameter of each toe 50 is substantially greater than the clearance between facing lips, as shown in FIG. 5. As shown, the upper face of each toe is spaced from the underside of the retainer and of a dimension to move sideways in the groove 16 of the track.

As shown, each leg 42 and 43 of the insert member 40 is swaged as at 56 to form a retainer for a spring member 58 received over each leg. The upper face of the retainer is counterbored around each aperture to provide a seat for the spring, as shown, and the counter-bore and swage cooperate to retain the associated spring in place. The springs 58 operate as biasing members to urge the retainer towards the toes 50 and away from the U-portion of the insert 40.

In operation, the anchor is positioned over the track 10 such that the toes 50 are in alignment with adjacent slots 20 as shown in FIG. 1. Thereafter, the insert is pushed downwardly from the dotted line position to the full line position of FIG. 2. As the insert is pushed down, the retainer 25 remains in a relatively upper position because the locking stud 35 overlies adjacent lips 21 of the track. The cooperating studs 46 and 47 are now positioned within the groove 16 of the track.

By moving the entire assembly sideways in the track 10, as shown in FIG. 3, from the dotted line position to the full line position, the shank 48 of each stud passes through the spaced lips while the locking stud 35 of the retainer is moved into alignment with that slot 20 between the adjacent lips 21 which overlie each of the studs 46 and 47, as shown in FIG. 3.

As alignment is achieved between the stud 35 and the slot 20, the springs 58 bias the retainer downwardly, as shown in FIG. 4 such that the stud 35 is backed in the slot 20 while the toe of each leg is positioned beneath the lips on each side of the slot 20 in which stud 35 is received. Thus, there can be no sideways or upward movement of the tie-down anchor relative to the track once the anchor is properly assembled thereto, as illustrated in FIGS. 4 and 5.

When properly assembled to a track, the insert member 40 forms the principal load-bearing member and remaining elements of the restraining system may be assembled to the loop formed by the U-portion of the insert 40. Thus, the load-bearing element is formed of one principal integral component which is the generally U-shaped insert having integral forward parallel legs.

To remove the anchor, the sequence is the reverse of that described, i.e. the retainer is lifted so that the locking stud 35 clears the slot 20 and the anchor is moved sideways so that the studs on the legs are in alignment with the slots. The anchor is then pulled out of the track.

The tie-down anchor of the present invention differs from prior dual stud anchors in that the principle load-bearing element is a single integral member. This feature also vastly simplifies the manufacture of the anchor, resulting in a unit that performs as well as prior units, is of a simpler structure and is relatively simple to make, thus reducing the cost of the unit. For example, the retainer may be of extruded aluminum alloy, cut to proper width, then drilled and counterbored to form the apertures 30 and 32. The stud 35 may be easily routed to provide arcuate faces 60 and 61 (FIG. 5) to fit the slots 20 of the track 10. The insert 40 may be in the form of a straight rod or wire of 5/16 inches diameter, for example, and threaded on each end. The rod is then bent into a U-shape with the legs in parallel alignment and each end of the legs being in alignment and spaced such that the center line of each leg is on the center line of the aperture of the track into which the fitting is to be received. The swaged spring retainers are then placed on the legs, the springs assembled over the legs, the retainer over the springs and then the studs are screwed into place. The studs may be retained in nonrotating relation by pins or preferably by crimping after assembly.

Where desired, the legs may be threaded in the crimped areas to receive a nut which can be threaded down to the upper face of the retainer to form a positive locking assembly.

In the form shown in FIG. 6, the assembly includes cold headed studs 75 formed on the ends of the legs of the U-shaped member 80 after swaging and after the springs have been assembled in place. In this form the entire insert is a unitary structural member with integral studs. The starting member is again a single piece of rod or wire of appropriate diameter. Rods of circular cross-section are preferred in this embodiment and in that previously described, for ease of machining and operation.

In one embodiment, the U-shaped insert member 80 is bent around the retainer 85 which includes sideways-extending slots 86 and 87. The operation of the anchor of FIG. 6 is the same as that described.

In an alternative embodiment, not shown, the retainer is in two pieces which may be assembled around the insert after the latter has been formed as described. The halves of the retainer are held together by pins or rivets.

In the preferred embodiment of FIG. 7, the retainer 25 includes a single elongated aperture through which both legs 42 and 43 of the insert 80 extend. A pin 96 extends across the aperture between the legs 42 and 43 and substantially perpendicular to the plane of the U-shaped insert 80. A torsion spring 58 is coiled around the pin 96. The ends of the spring 58 extend toward the legs 42 and 43 and into small holes 98 in the opposing surfaces of the legs where the ends are slidably retained. The spring 58 yieldingly opposes motion of the retainer 25 toward the closed end of the U-shaped insert 80, and hence acts to yieldingly oppose removal of the locking stud 35 from the slot of the track once the anchor has been affixed to the track. Other forms of spring could be used, such as a leaf spring.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A quick disconnect dual stud-type tie-down anchor for use with a track having a groove and spaced upper flanges, the flanges forming a series of slotted lips, each of predetermined dimensions, the tie-down anchor being assembled to the track by insertion of the studs thereof through the slots for retention under the flanges and being removed by passage of the studs through the slots, comprising:

retainer means including spaced lifting portions, a single aperture elongated in the direction of the track, and locking means dimensioned to be received through a slot of the track;

insert means positioned in the single aperture, having a generally U-shaped body, and including substantially parallel legs for alignment with the slots of the track and extending through the single aperture;

stud means at the end of each of said legs dimensioned to be received through the slots of the track; and, biasing means positioned in the single aperture and acting between said insert means and said retainer means to bias said locking means into a slot of the track when said stud means are positioned under the lips of the track.

2. The quick disconnect anchor of claim 1 wherein said stud means are integral parts of said legs.

3. The quick disconnect anchor of claim 1 wherein the legs of said insert means are generally circular in cross-sectional shape.

4. The quick disconnect anchor of claim 1 wherein said locking means is integral with said retainer means.

5. The quick disconnect anchor of claim 1 wherein each of said stud means includes a face, each said face lying in substantially the same plane.

* * * * *